United States Patent [19]

Haack

[11] 4,090,576
[45] May 23, 1978

[54] SLIDING-WEIGHT SCALE

[76] Inventor: Werner Haack, Giacomettistrasse 102, CH-700 Chur, Switzerland

[21] Appl. No.: 728,419

[22] Filed: Sep. 29, 1976

[30] Foreign Application Priority Data

Oct. 1, 1975 Germany .............................. 2543719

[51] Int. Cl.² .............................................. G01G 7/00
[52] U.S. Cl. .................................................... 177/214
[58] Field of Search ................................ 177/213, 214

[56] References Cited

U.S. PATENT DOCUMENTS

| | | | |
|---|---|---|---|
| 3,472,330 | 10/1969 | Hino | 177/214 |
| 3,512,596 | 5/1970 | Haack | 177/213 |
| 3,810,638 | 5/1974 | Haack | 177/214 X |

FOREIGN PATENT DOCUMENTS

| | | | |
|---|---|---|---|
| 295,029 | 12/1971 | U.S.S.R. | 177/213 |

*Primary Examiner*—George H. Miller, Jr.
*Attorney, Agent, or Firm*—Haseltine, Lake & Waters

[57] ABSTRACT

An automatic sliding-weight scale arrangement with a hinge-supported scale beam. A continually motor-driven friction drive moves a sliding weight along the scale beam. The friction drive has at least two frictional elements, one of which is attached to the frame, and the other is attached to the scale beam. One of the frictional elements, furthermore, is supported exclusively by one or several rotary friction units and is displaceable in a rotationally and lengthwise manner for moving the sliding weight. A lengthwise displaceable friction roller is supported by a rotary friction unit located vertically underneath it, as well as by a rotary friction element on one side and an additional friction unit on the opposite side. Two of the friction units are mounted on the scale beam, and the friction element is mounted on the frame. The friction unit may be in the form of two coaxially-spaced friction disks of the same size.

9 Claims, 9 Drawing Figures

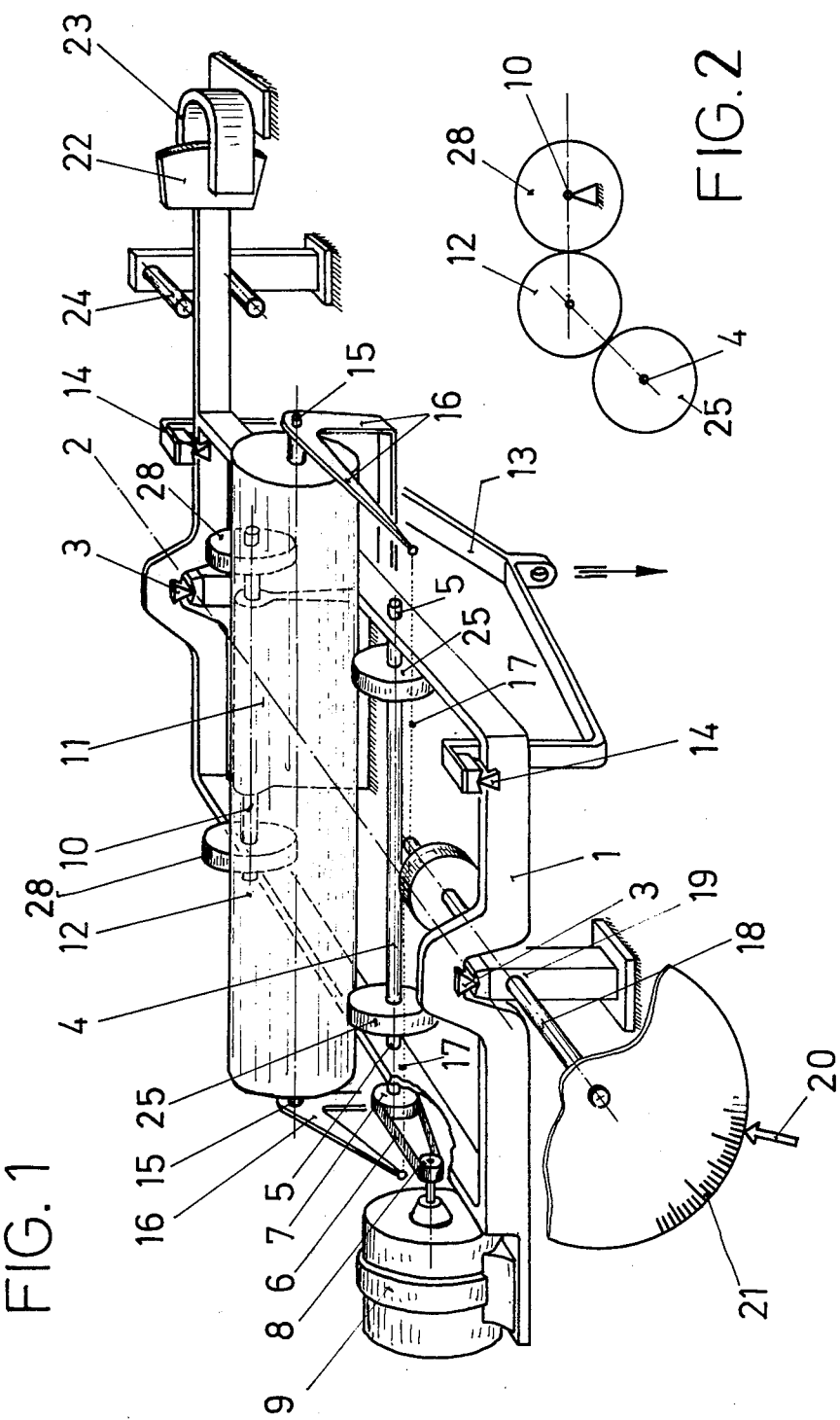

SLIDING-WEIGHT SCALE

BACKGROUND OF THE INVENTION

The present invention relates to an automatic sliding-weight scale with a hinge-supported scale beam, and a continually motor-driven friction drive which moves a sliding weight along the scale beam. This friction drive comprises at least two friction elements one of which is attached to the frame and the other to the scale beam and one of which is used for moving the sliding weight.

With a known sliding-weight scale of this type (German patent DT-PS 2 200 533) there is provided on the scale beam a guide along which the friction element in the form of a friction roller is shifted lengthwise. Between the shift guide and the bearings there is continuous relative rotation so that small displacement forces are sufficient for lengthwise displacement of the friction roller.

It is an object of the present invention to simplify the above-described sliding weight scale with regard to its mounting, to increase the displacement sensitivity of the sliding weight and to improve the high accuracy.

Another object of the present invention is to provide a sliding weight scale of the foregoing character which is simple in construction and may be economically fabricated.

A further object of the present invention is to provide a sliding weight scale, as described, which may be readily maintained in service and has a substantially long operating life.

SUMMARY OF THE INVENTION

The invention is based on the above-described sliding-weight scale and is based on the idea that the friction element used for displacing the sliding weight is supported exclusively by one or several rotary friction arrangements which are rotating and can be displaced lengthwise.

The present invention has the advantage that any additional expensive straight-line guides can be dispensed with. In the simplest case, the friction roller representing the sliding weight rests at three points loosely on a rotating friction element and two coaxially spaced rotating friction disks located on the other side of the friction roller. The construction expense is thereby appreciably reduced, the displacement (shift) sensitivity is improved and the weighing accuracy is increased.

Alternatively, the friction roller is supported by at least 4 rotating disks mounted on the scale beam and is driven by a frame-fixed friction element. This construction results in a longer displacement path, and hence greater resolution and increased accuracy.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a sliding weight scale in accordance with the present invention;

FIG. 2 is an end view of several elements in the arrangement of FIG. 1;

DESCRIPTION OF THE PREFERRED EMBODIMENTS

Figure 3:
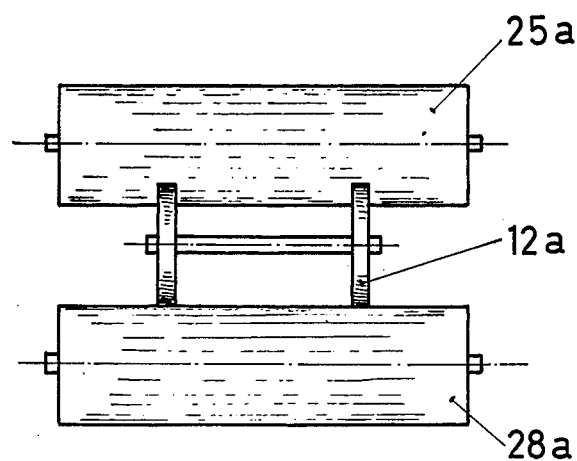
FIG. 3 is a side view and shows another embodiment of the arrangement of FIG. 1.

Referring to FIG. 1, a balance beam 1 pivots about a pivot axis 2 which is formed by frame-fixed step bearings 3. On the balance beam 1, a shaft 4 is supported in bearings 5 which are provided with two friction disks 25, 25 which are of equal size and are an axial distance apart. The shaft 4 is continuously rotated via a pulley 7 and a belt 6 by a pinion 8 of a drive motor 9. Motor 9 is also attached to the balance beam. Parallel with shaft 4 and at right angles to pivot axis 2, is a horizontal shaft 10 which is rotatably supported in a frame-fixed bearing 11 and has a friction disk arrangement comprising two equal-sized friction disks 28, 28 which are an axial distance apart. A cylindrical friction roller 12 freely rests on the four friction disks 25, 25 and 28, 28. The friction disk arrangement 25, 25 takes the entire vertical force of roller 12, because the axis of rotation of the roller 12 and that of the friction disk arrangement 28, 28 are in a horizontal plane as shown in FIG. 2. The horizontal components of the support forces of both friction element arrangements 25, 25 and 28 are of equal magnitude, but in the opposite direction. The weighing load is transmitted via a load bracket (lifting eye) 13 and two knife-edge supports 14 to the balance beam 1.

The friction roller 12 at its forward sides has coaxial trunnions from which via pivot bearings 15 hangs a bracket 16 to which a steel ribbon 17 is attached. The ribbon is wound around a disk of a pointer or indicator shaft 18 which is rotatably supported in a bearing 19. The weighing load can be read by means of pointer 20 and scale 21. The damping of the scale beam is accomplished by damping disk 22 and a magnet 23. The beam deflection is restricted by stops 24.

FIG. 3 represents a modification since the friction arrangements 25a and 28a comprise rollers while the sliding weight is made up of a friction disk arrangement 12a with two friction disks. In place of the double disk arrangement 12a, one may also use a short roller.

Figure 4:
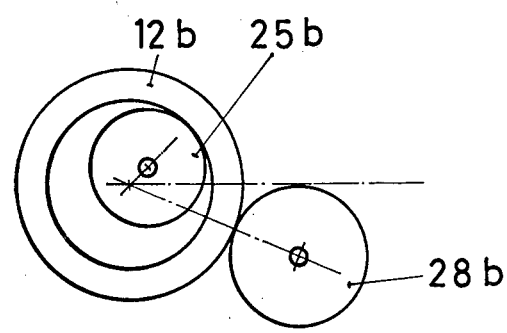
FIG. 4 and FIG. 5 are schematic and end views and show further embodiments of the friction devices used in the present invention.
Figure 5:
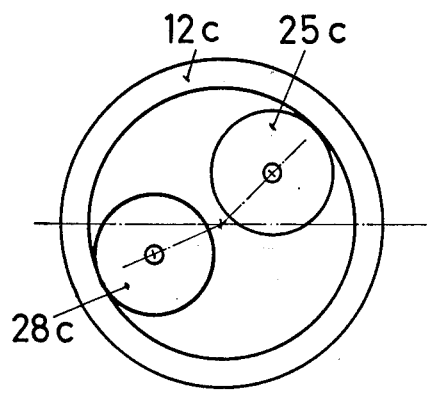

FIGS. 4 and 5 schematically illustrate other friction arrangements which have in common that a hollow roller is used as a movable friction element. According to FIG. 4, a friction disk pair 25b, supported on the balance beam, is located inside hollow roller 12b while the frame-fixed friction disk pair 28 contacts the outer periphery of hollow roller 12b. In contrast with the embodiment of FIG. 2 the axes of rotation of the displaceable roller and of the friction disk arrangement 28b on the frame are not aligned horizontally; rather, the axis of rotation of the friction disk arrangement 28 lies lower, so that it receives a small vertical component of the supporting force.

FIG. 5 illustrates a hollow roller 12c which encloses both friction arrangements 25c and 28c. The disks of the friction arrangement 25c are supported on the balance beam. They receive the major part of the vertical support forces, so that when the scale load changes in relation to FIG. 4, there is a larger operating angle between hollow shaft 12c and the friction disk pair 28c which is supported by the frame.

Figure 6:
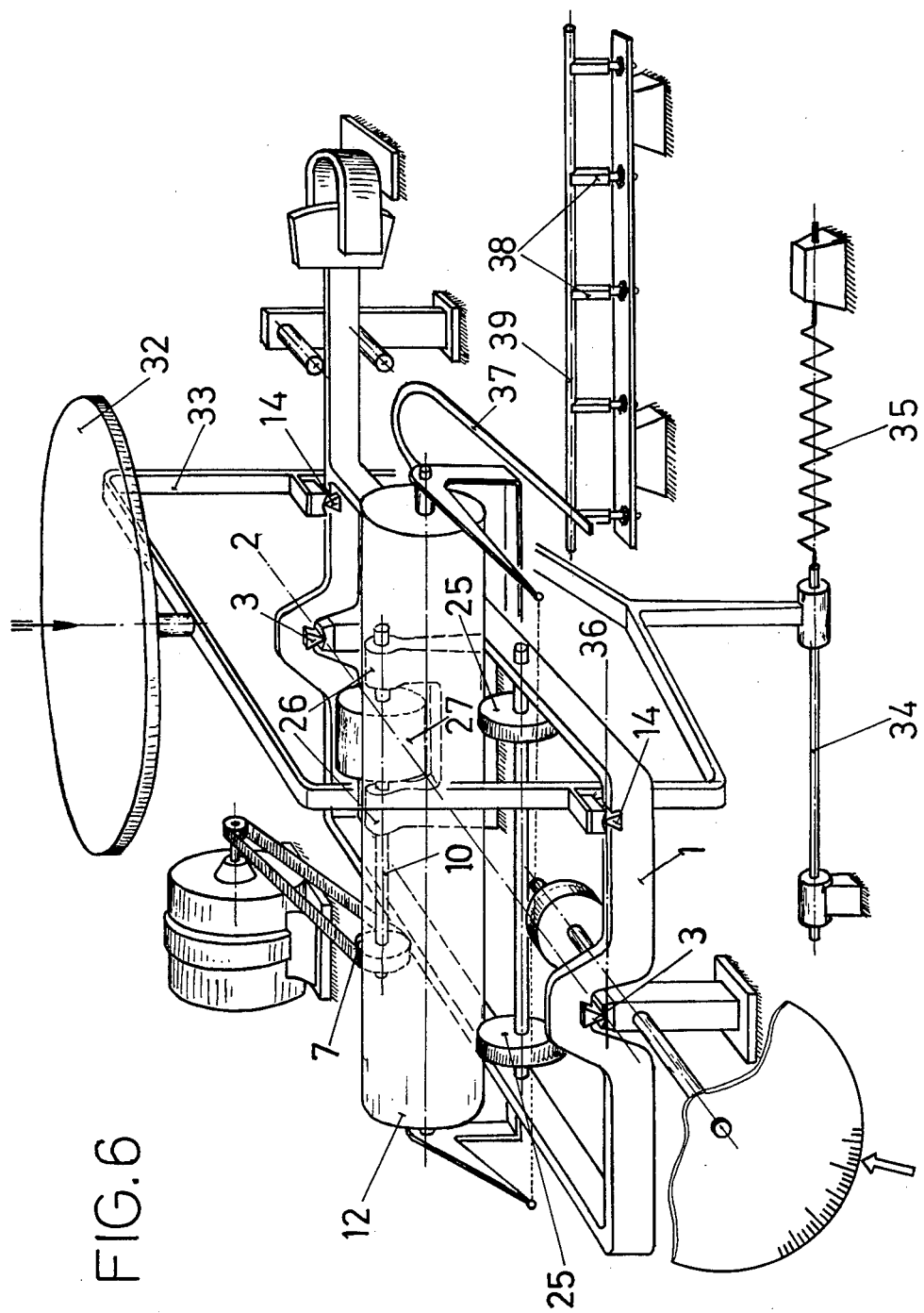
FIG. 6 is a perspective view of a further embodiment of the arrangement of FIG. 1.

FIG. 6 illustrates a modification of a sliding weight scale, since, instead of the frame-fixed friction disks 28, a short roller 27 is mounted on the frame-fixed shaft 10 through whose axial center the pivot axis 2 of the scale beam 1 passes. The shaft 10 is motor-driven via pulley 7. The weighing load is transmitted via a load pan 32, cross-beam 33 and knife-edge 14 to beam 1. The load pan is guided via a simple spring bar 34 and dampened with an additional stabilizing spring 35 which acts in the direction of the spring bar and parallel to the knife edge axis 36 of the scale beam 1.

For correcting the linearity, a spring 37 is provided; it slides along a rail 39 which can be adjusted with screws 38.

Figure 7:
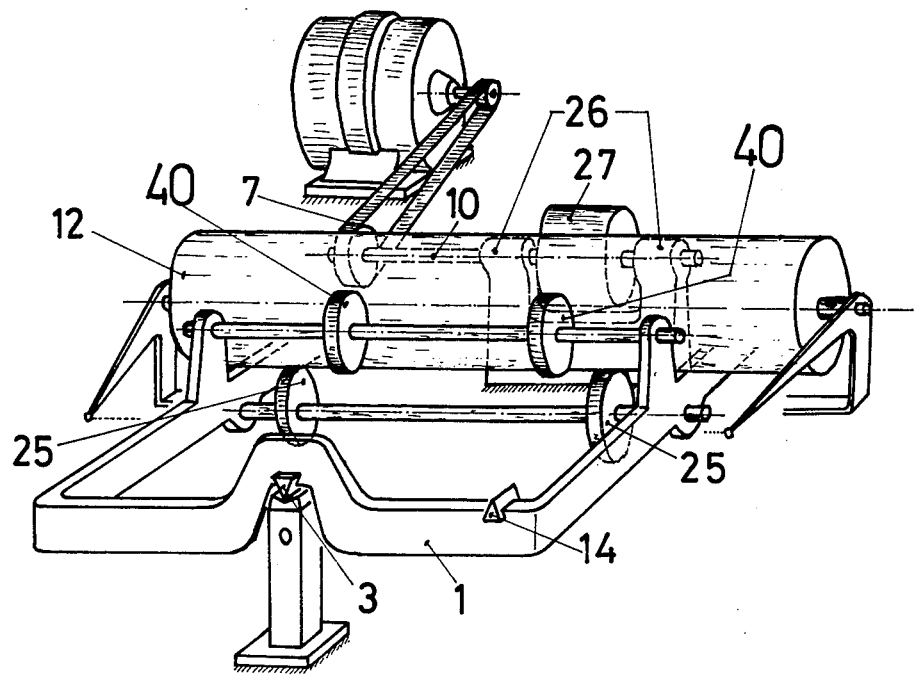
FIG. 7 is a perspective view of another embodiment of part of FIG. 6.
Figure 8:
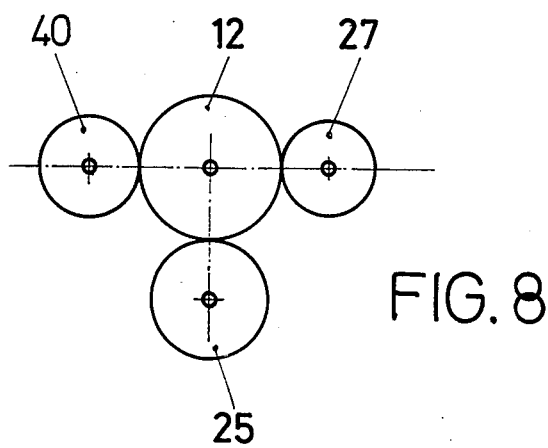
FIG. 8 is an end view of elements used in the embodiment of FIG. 7.

FIGS. 7 and 8 show a further modification of the sliding weight scale of FIG. 6, showing only the points of difference. The disk arrangement comprising the two friction disks 25, 25 is essentially located vertically underneath the friction roller 12 on the scale beam in a rotary fashion. An additional friction disk arrangement, also comprising two coaxially spaced frictional disks 40, 40, is located diametrically opposite the short roller 27 on the beam scale in a rotary fashion. The axes of the short roller 27, of the friction roller 12 and of friction disks 40 are at least approximately in the same horizontal plane. Hence the friction disks 25, 25 at least approximately provide the vertical support of the friction disk, while the additional friction disks 40, 40 only take the pressure force of the short roller 27.

The axis of the frame-fixed short roller 27 should, if possible, be aligned horizontally with the axis of rotation of friction roller 12. The two other friction arrangements 25 and 40, differing from FIG. 8, may be displaced angularly with respect to their vertical or horizontal alignment with the axis of rotation of roller 12.

The arrangement of FIG. 7 results in a large travel of friction roller 12 and hence a high accuracy of the scale. Also the adjustment of the scale is simple, because the friction roller 12 is carried and guided exclusively by the friction arrangements 25, 25 and 40, 40 supported on the scale beam. The short roller 27 mounted on the frame is exclusively used for the lengthwise displacement of the friction disk.

Figure 9:
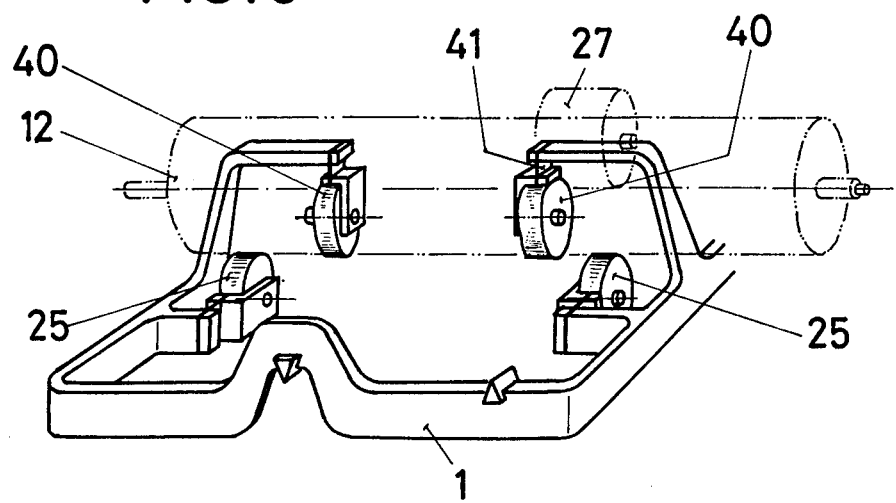
FIG. 9 is an isometric view and shows the construction for avoiding sliding resistances, in accordance with the present invention.

During the axial displacement of the friction roller 12, there occur sliding resistances between it and the friction disks. In order to avoid them, the friction disks 25, 25 and 40, 40 in FIG. 9 are hinge-attached to the scale beam 1 by means of spring plates 41 so that they automatically adjust with their peripheral directions in the resultant direction of lengthwise motion and peripheral motion of the friction roller. Hence guidance of the friction roller during its rotation and axial displacement is possible in a completely non-slipping manner. This leads to a higher shifting speed and hence to a reduction of weighing time and increase in weighing accuracy.

The mode of operation is the same for all embodiments and is explained by means of FIG. 1. If there is a load increase on the load bracket 13, the scale beam 1 pivots about the pivot shaft 2 in the clockwise sense till it hits the lower stop 24. This pivoting motion is shared by the friction arrangement 25. Since according to FIG. 2, the frame-fixed friction arrangement 28 transmits no vertical forces, the friction roller 12 participates in the entire pivoting motion of the scale beam 1. Between the friction roller 12 and the friction disk arrangement 28 there develops an operating angle which, with a proper choice of the roller rotation, results in a left-hand displacement of the friction roller 12 and all parts connected thereto till the load increase on the load bracket 13 is compensated. In this new compensated state, the scale beam 1 has again assumed its initial horizontal position. The displacement path of roller 12 is transmitted via bracket 16 and the steel ribbons 17 as rotation to the pointer or indicator shaft 18 and can be read directly by means of indicator device 20, 21.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claim.

What is claimed is:

1. An automatic sliding-weight scale arrangement employing a frame; a hinge-supported scale beam; a continually motor-driven friction drive means; a sliding weight moved along said scale beam by said motor-driven drive means; wherein: said friction drive means is provided with at least two frictional elements, one of which being rotatably supported and lengthwise displaceable on said scale beam for moving said sliding weight exclusively by said rotary friction means supporting said frictional element at its circumference.

2. The sliding-weight scale arrangement as defined in claim 1, wherein: at least one of said rotary friction means comprises two coaxially spaced friction disks of equal size.

3. The sliding-weight scale arrangement as defined in claim 1, including: a non-rotating bracket with coaxial end journal bearings located on said displaceable rotating friction element; and indicating means connected to said non-rotating bracket.

4. The sliding-weight scale arrangement as defined in claim 1, wherein: said displaceable friction element being defined by hollow roller and having said rotary friction means disposed therein.

5. The sliding-weight scale arrangement as defined in claim 1 including: a lengthwise displaceable friction roller supported by said rotary friction means disposed vertically underneath said friction roller, said friction roller being additionally supported by the other one of said friction elements on one side and another rotary friction means on the opposite side.

6. The sliding-weight scale arrangement as defined in claim 5, wherein: the first rotary friction means and said other rotary friction means are mounted on the scale beam, said other one of the frictional elements being mounted on said frame.

7. The sliding-weight scale arrangement as defined in claim 5 wherein: the axes of rotation of the frictional element supported on said frame, the friction roller and said other one of the rotary friction means are substantially located in one horizontal plane.

8. The sliding-weight scale arrangement as defined in claim 1, wherein: said rotary friction means comprises coaxially spaced friction disks; a hinged joint attaching said friction disks, the rotary axes of which being adjustable in a direction perpendicular to peripheral and axial motion.

9. The sliding-weight scale as defined in claim 8, wherein: said hinged joint comprises a spring plate.

* * * * *